United States Patent
Seman, Sr. et al.

(10) Patent No.: US 8,337,738 B1
(45) Date of Patent: *Dec. 25, 2012

(54) PROCESS TO MAKE A WATERWAY CONNECTOR

(75) Inventors: Richard F. Seman, Sr., Middlefield, OH (US); Earl Christian, Jr., Warren, OH (US)

(73) Assignees: Mercury Plastics, Inc., Middlefield, OH (US); Masco Corporation, Taylor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,992

(22) Filed: Apr. 18, 2011

Related U.S. Application Data

(63) Continuation of application No. 12/618,332, filed on Nov. 13, 2009, now Pat. No. 7,927,534.

(51) Int. Cl.
*B29C 45/14* (2006.01)

(52) U.S. Cl. ........ 264/251; 264/250; 264/254; 264/261; 264/275

(58) Field of Classification Search .................. None
See application file for complete search history.

(56) References Cited

U.S. PATENT DOCUMENTS

| | | | |
|---|---|---|---|
| 2,200,091 A | 5/1940 | Kovach | |
| 3,520,325 A | 7/1970 | Stuart | |
| 3,998,240 A | 12/1976 | Liautaud | |
| 5,447,341 A | 9/1995 | Hartel et al. | |
| 5,895,695 A | 4/1999 | Rowley | |
| 6,287,501 B1 | 9/2001 | Rowley | |
| 6,432,345 B1 | 8/2002 | Warburton-Pitt | |
| 6,635,214 B2 | 10/2003 | Rapacki et al. | |
| 7,398,954 B2 | 7/2008 | Herren et al. | |
| 7,406,980 B2 | 8/2008 | Pinette | |
| 7,766,043 B2 | 8/2010 | Thomas et al. | |
| 7,927,534 B1* | 4/2011 | Seman et al. | 264/250 |
| 2007/0271695 A1* | 11/2007 | Thomas et al. | 4/675 |
| 2010/0313979 A1* | 12/2010 | Thomas et al. | 137/625.4 |
| 2011/0259456 A1* | 10/2011 | Pinette et al. | 137/603 |

OTHER PUBLICATIONS

U.S. Appl. No. 12/618,158, filed Nov. 13, 2009.
U.S. Appl. No. 12/618,089, filed Nov. 13, 2009.
U.S. Appl. No. 12/618,226, filed Nov. 13, 2009.
U.S. Appl. No. 12/618,296, filed Nov. 13, 2009.

\* cited by examiner

*Primary Examiner* — Edmund H. Lee
(74) *Attorney, Agent, or Firm* — Hahn Loeser + Parks, LLP

(57) ABSTRACT

A process is described which uses overmolding to create an all plastic waterway within a faucet leading up to an inlet port for a spout. The waterway connector has at least two arms and a central connector and wherein the process includes the steps of: at least partially inserting one end of a tube into a first split mold; inserting at least two pins at least partially into the mold, a first pin inserted into the at least one end of the tube and a second pin inserted essentially normal to the direction of insertion of the first pin; injection overmolding a first geometry onto the one end of said tube and forming a profile for fluid transfer with the second pin and associated mold surfaces, the profile having a terminal lip; at least partially inserting two of the profiles with terminal lips into a second split mold, each of the profiles being a mirror image of the other, onto a core having a mating profile for each lip, the mating profile on said core comprising opposing grooves; and injection overmolding a second geometry about the lips to form a leak-proof upwardly extending connector. The process optionally contains the step of crosslinking the waterway connector.

12 Claims, 10 Drawing Sheets

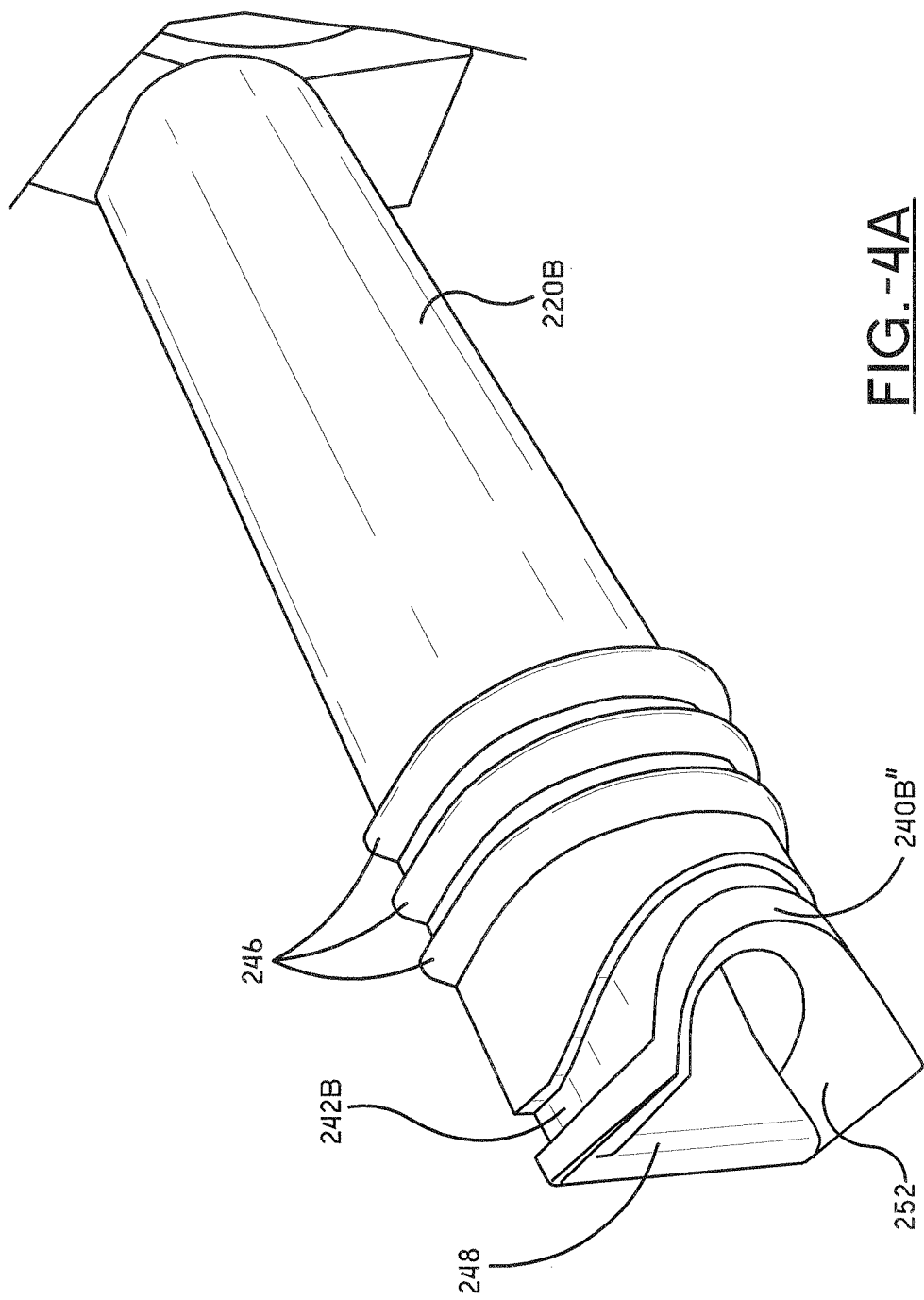

PROCESS TO MAKE A WATERWAY CONNECTOR

CROSS-REFERENCE

This application is a continuation of U.S. patent application Ser. No. 12/618,332 filed Nov. 13, 2009, now U.S. Pat. No. 7,927,534.

TECHNICAL FIELD OF THE INVENTION

The invention described herein pertains generally to a connection between a first waterway component and a second waterway component and, more particularly, to an overmolded coupler disposed therebetween which secures the first waterway component to the second waterway component in a faucet assembly.

BACKGROUND OF THE INVENTION

Faucets are generally controlled by either a single handle which utilizes a mixing valve to proportion the flow of hot and cold water to a delivery spout, or dual-handles which utilize two individual valves to control the flow of hot and cold water. The valve bodies which house the respective valves are each typically connected to an upstream waterway through a conventional mechanical connection, such as mating threads. Further, each valve body is typically connected to a downstream waterway by brazing the valve bodies to the downstream waterway. In other examples the valve bodies and the downstream waterway are cast as a single component. Brazing requires additional time, assembly, and inspection. One of the problems with a brazing connection is that undesirable materials, such as harmful metals may be communicated from the brazing material into the water passing through the connection. Additionally, brazing requires an etching operation to be performed subsequent to the brazing operation.

In an exemplary embodiment of the Prior Art, a faucet for connection to a water supply having a hot water supply and a cold water supply is provided and illustrated in FIG. 1. The faucet comprises: a hot water inlet member having a hot water fluid inlet adapted to be coupled to the hot water supply, a hot water fluid outlet, and an internal waterway connecting the hot water fluid inlet to the hot water fluid outlet; a cold water inlet member having a cold water fluid inlet adapted to be coupled to the cold water supply, a cold water fluid outlet and an internal waterway connecting the cold water fluid inlet to the cold water fluid outlet; a waterway component having a first fluid inlet, a second fluid inlet, a fluid outlet and an internal waterway connecting the first fluid inlet, the second fluid inlet, and the fluid outlet; at least one coupler configured to maintain the position of the hot water inlet member relative to the waterway component and to maintain the position of the cold water inlet member relative to the waterway component, the at least one coupler connecting at least a first portion of the hot water inlet member, a first portion of the cold water inlet member, and a first portion of the waterway component, the at least one coupler coupling the hot water inlet member and the waterway component such that the internal waterway of the hot water inlet member is in fluid communication with the internal waterway of the waterway component and coupling the cold water inlet member and the waterway component such that the internal waterway of the cold water inlet member is in fluid communication with the internal waterway of the waterway component. A seal is positioned between the first waterway component and the second waterway component. In a further example, the first waterway component and the second waterway component are housed in an escutcheon and the first user input device extends above the escutcheon.

As shown in FIG. 1, fluid outlet 110 (110B shown) is coupled to a fluid inlet 122 (122A is shown) of a waterway component 100. Fluid outlet is 110 is positioned in portion 104A, 104B of valve bodies 102A, 102B which are illustratively shown as being generally hex-shaped with a flat surface 106 (106B shown) providing fluid outlet 110.

Waterway component 100 includes two generally tubular portions 120A, 120B each having an internal waterway 132A, 132B and each configured to mate with valve bodies 102A, 102B respectively. Portions 120A, 120B are generally shown to be arranged in a V-shaped arrangement. This arrangement is to provide clearance for a drain assembly (not shown) of the faucet. In other embodiments, portions 120A, 120B may be generally co-linear. Further waterway component 100 may be comprised of multiple waterway components which are coupled together.

Each portion 120A, 120B includes a flange 118A, 118B and a seal surface 114A, 114B. A seal 126A, 126B (e.g., an O-ring) is positioned over seal surface 114A, 114B and rests against surface 124 (124A shown) of flanges 118A, 118B. Seals 126A, 126B also rest against a seal surface 112 (112B shown) of valve bodies 102A, 102B when valve bodies 102A, 102B are coupled to waterway component 100. Although the positioning of seal 124A, 124B may hold valve bodies 102A, 102B and waterway component 100 together absent an external force and/or fluid flowing through the respective valve bodies 102A, 102B and waterway component 100, additional coupling is required.

Waterway component 100 further includes an upright portion 130 having a waterway 128. Upright portion 130 includes a reduced portion 132 which is configured to be coupled to a downstream waterway within a spout (not shown). As such, assuming both valves are open, hot water from valve body 102A enters first portion 120A of waterway component 100 and cold water from valve body 102B enters second portion 120B of waterway component 100. The hot water and cold water are combined in waterway component 100 and flow through upright portion 130 into downstream waterway and out of a fluid outlet at a tip of a faucet spout.

However, the use of O-rings and other mechanical connections are possible pathways for leaks. Therefore, there is a need in this industry for the development of an overmolded pathway in which the waterways are connected in a leak-proof manner through the utilization of overmolding technology as herein below described.

SUMMARY OF THE INVENTION

The invention herein describes a process to make a waterway connector having at least two arms and a central connector comprising the steps of: at least partially inserting one end of a tube into a first split mold; inserting at least two pins at least partially into said mold, a first pin inserted into the at least one end of said tube and a second pin inserted essentially normal to the direction of insertion of the first pin; injection overmolding a first geometry onto the one end of the tube and forming a profile for fluid transfer with the second pin and associated mold surfaces, the profile having a terminal lip; at least partially inserting two of the profiles with terminal lips into a second split mold, each of the profiles being a mirror image of the other, onto a core having a mating profile for each lip, the mating profile on said core comprising opposing grooves; and injection overmolding a second geometry about the lips to form a leak-proof upwardly extending connector. The process optionally contains the step of cros slinking the waterway connector.

These and other objects of this invention will be evident when viewed in light of the drawings, detailed description and appended claims.

BRIEF DESCRIPTION OF THE DRAWINGS

FIG. 4a is an enlarged perspective view of another embodiment of one waterway component illustrating a waterway lip which has a concave portion at the ceiling;

DETAILED DESCRIPTION OF THE INVENTION

Figure 1:
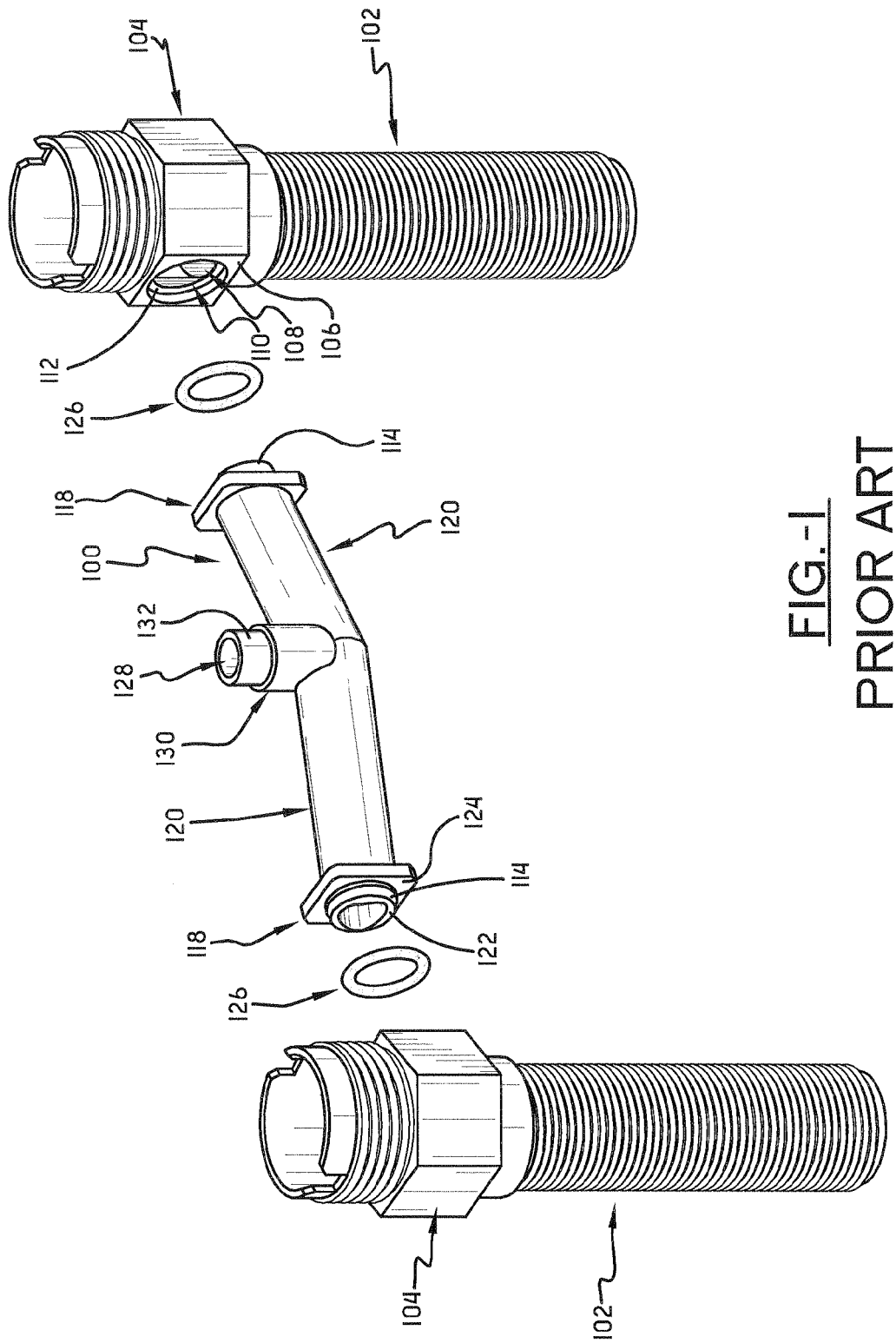
FIG. 1 is an exploded view of a hot water valve body, a cold water valve body, and a waterway component of the Prior Art.

The best mode for carrying out the invention will now be described for the purposes of illustrating the best mode known to the applicant at the time. The examples are illustrative only and not meant to limit the invention, as measured by the scope and spirit of the claims. The embodiments selected for description have been chosen to enable one skilled in the art to practice the invention. Although the disclosure is described in connection with water, it should be understood that additional types of fluids (including gases) may be used. As used in this application, the letter designations "A" and "B" correspond to mirror images of the same part or component of the part, and therefore, are preceded with the same reference numeral to the extent practicable.

Traditional overmolding requires a tube to be placed onto a core pin within the mold. The core pin provides support to the internal diameter ("ID") of the tube, so that it can be clamped, as well as prevent plastic from entering the ID of the tube. Waterways in which the axis of the tube and the axis of the core are co-linear are known. However, there are physical limitations to overmolding onto a tube in a tight 90° radius. The Prior Art teaches that in order to create a typical 90° elbow, the sweep must be of a radius large enough to allow the core pin to create an arc that permits the core pin to be retracted. This limits the application to flexible or elastomeric plastics.

Figure 2:
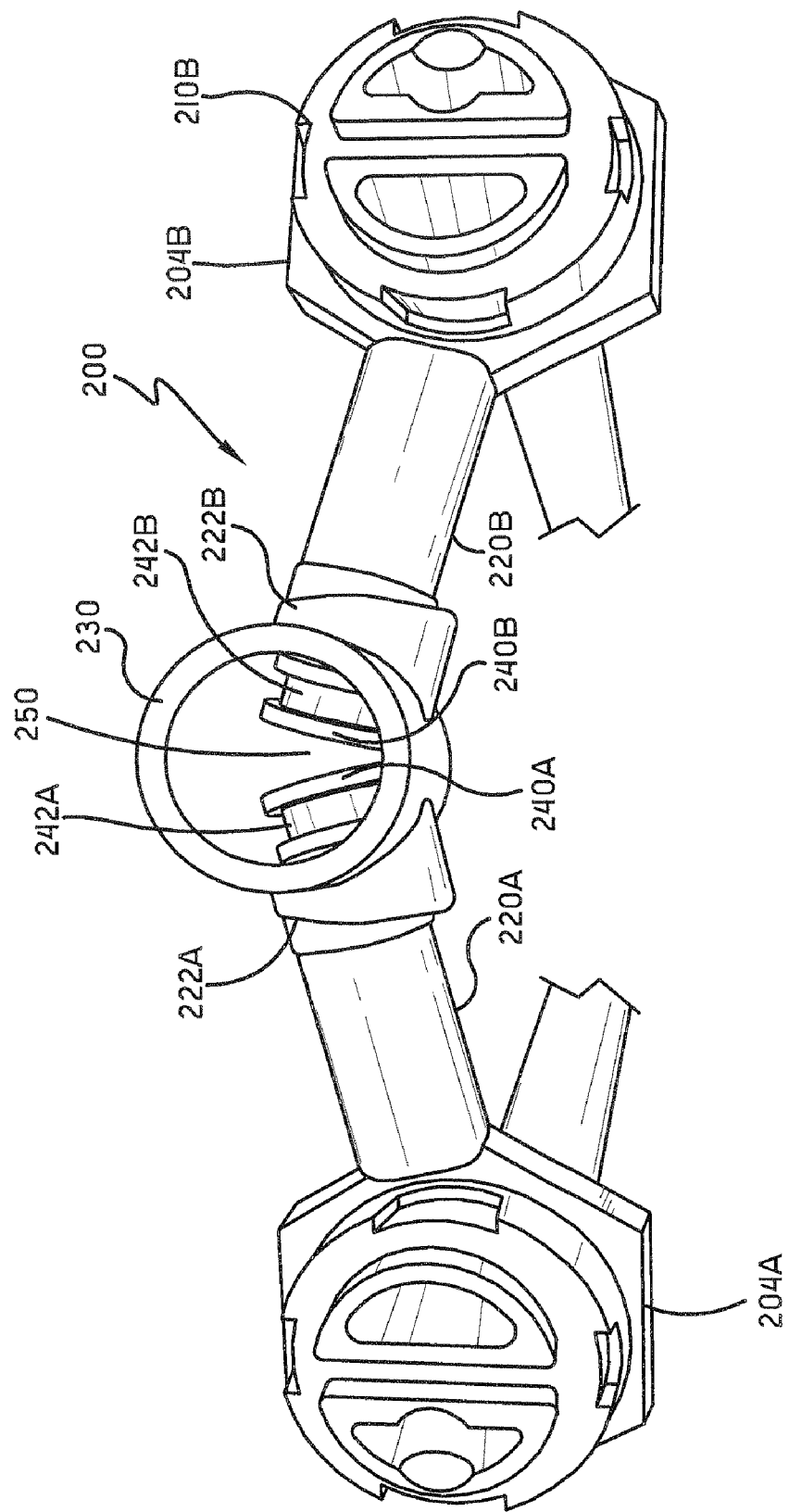
FIG. 2 is a top elevational view of a hot water valve body; a cold water valve body, and a waterway component of the invention illustrating one embodiment of a core-part interlock component combination.

FIG. 2 illustrates one embodiment of the present invention employing a series of overmolding operations in order to achieve a leak-proof component part assemblage. Waterway component 200 comprises two waterway arms 220A, 220B for respective cold and hot water respectively, each arm originating at valve bodies 210A, 210B which are illustratively shown as being generally hex-shaped with flat surfaces 204A, 204B. Each arm extends into upright portion 230 of the central connector and meets interiorly in a V-shaped configuration, although there is no need to limit the invention to either a linear or non-linear relationship of the arms. Central connector 230 is overmolded laterally at locations 222A, 222B about each arm in a manner herein below described. Lips 240A, 240B extend circumferentially about the end of each arm 220A, 220B. Interior of each arm end, circumferential slots or grooves 242A, 242B extend, although the slot or groove is optional. V-shaped gap 250 is between each arm lip 240A, 240B and is formed in a manner described later involving the use of a core pin with an insert cavity.

Figure 3:
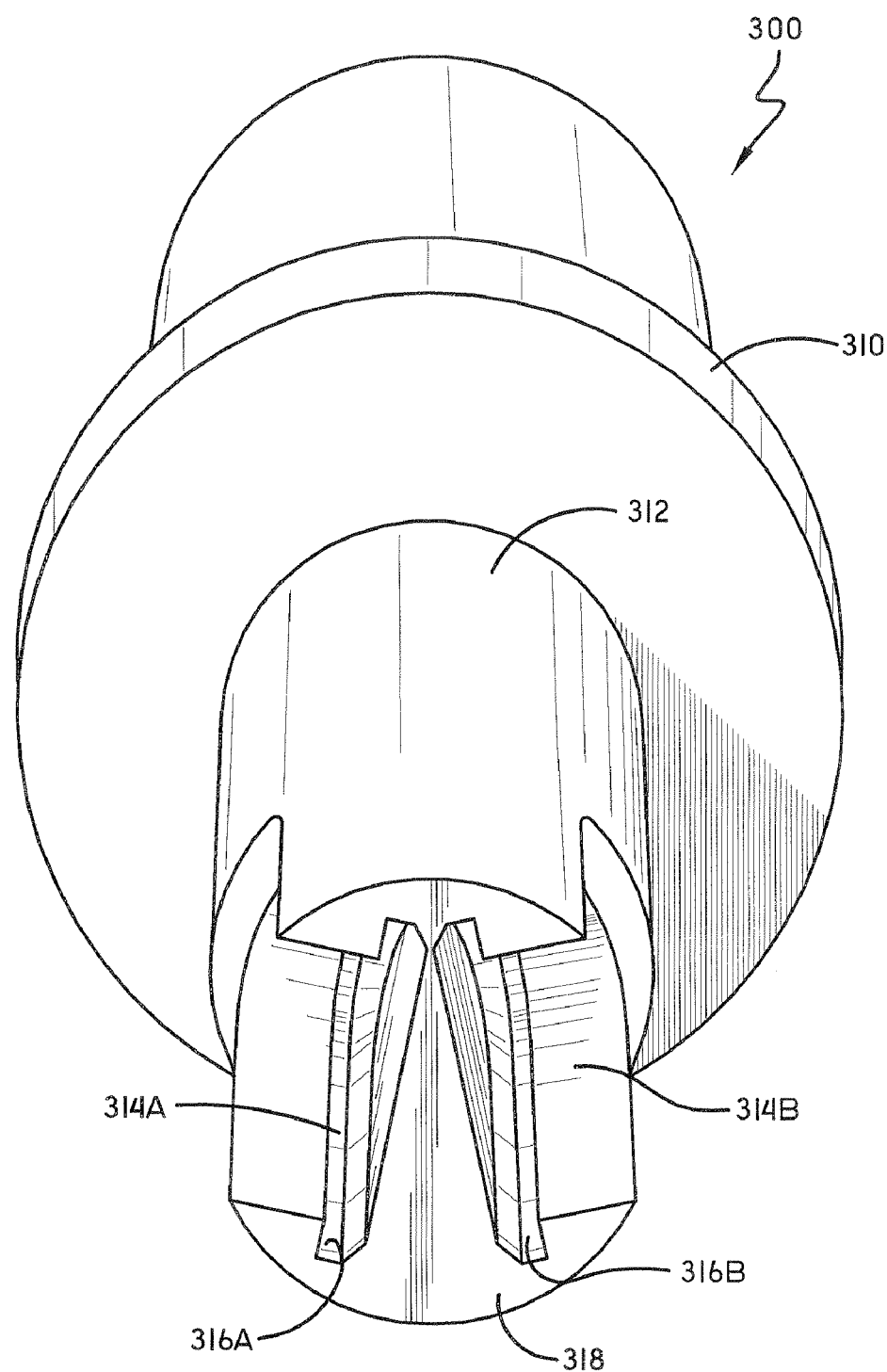
FIG. 3 is a bottom elevational view of a core-part interlock core pin.

As better illustrated by a combination of FIG. 2 and FIG. 3, V-shaped gap 250 is created by core-part interlock core pin 300. The pin has a circular top ledge 310, a bottom 318 and a cylindrical shaft 312 with two openings 314A, 314B disposed therein, each opening terminating in a deeper grooved region 316A, 316B. During the overmolding process which forms central connector 230, each lip 240A, 240B is positioned into respective deeper grooves 316A, 316B. The interface of the terminal end of each waterway 220A, 220B with the interior wall of grooves 316A, 316B prohibits the ingress of molten polymer during the overmolding process, thereby keeping the terminal ends of each waterway open within central connector 230. The optional grooves 242A, 242B on respective waterways 220A, 220B interface with openings 314A, 314B and assist in maintaining securing engagement between the terminal ends of each waterway with the interior wall of grooves 316A, 316B.

In one embodiment of the invention, a sacrificial insert is employed. As used in this application, the term "sacrificial" means that the insert becomes a permanent component of the finished product. The insert contains a throughway in which a fluid may pass. The insert is placed into the tube, with the insert/tube combination positioned into a cavity within the core pin itself (the "insert cavity"). This insert cavity protects the opening of the insert from the molten plastic during the overmolding process. When the finished part is removed from the core pin, the insert slides out of the insert cavity within the core pin and becomes a permanent component of the finished part.

Figure 4:
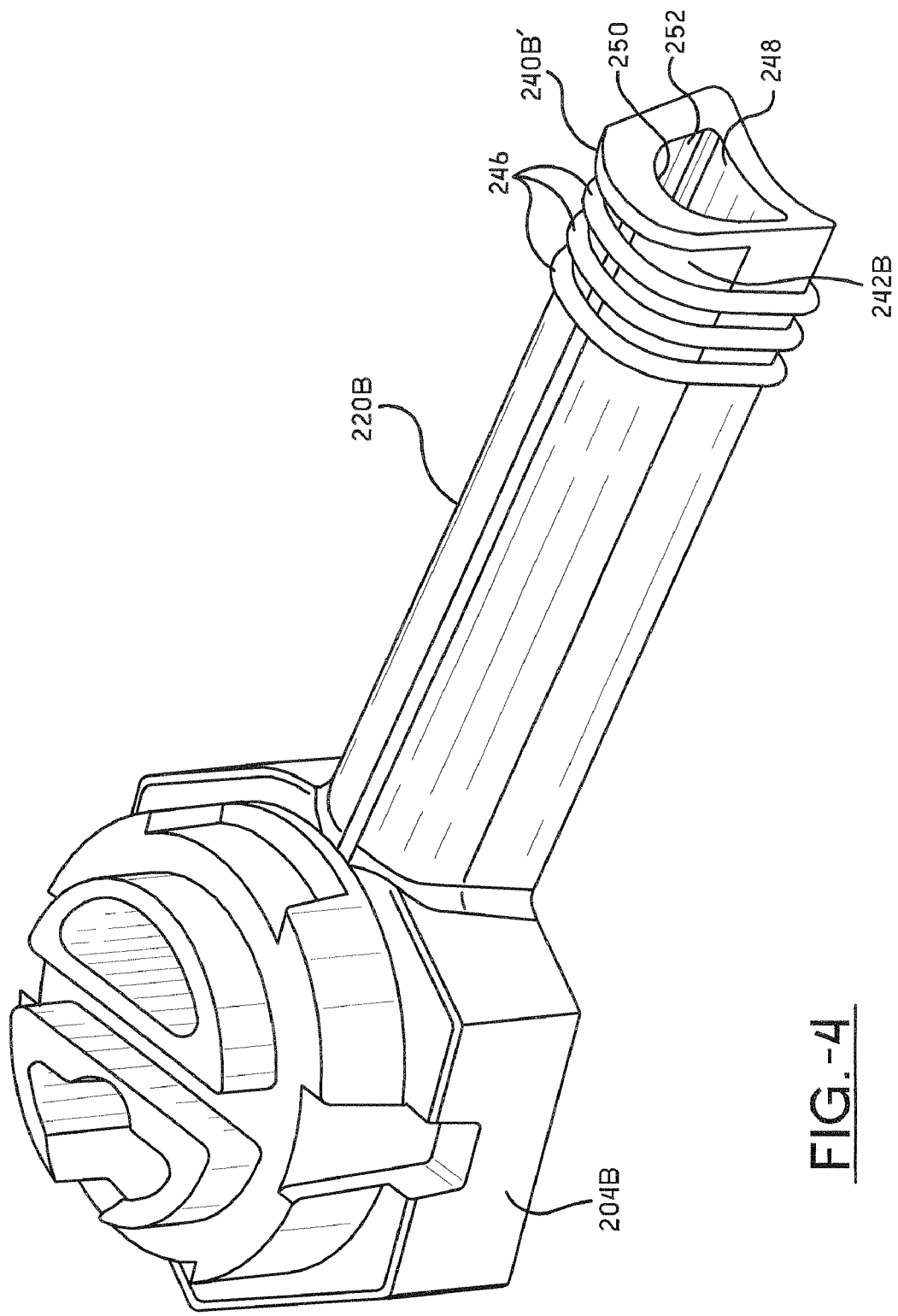
FIG. 4 is an enlarged perspective view of one embodiment of one waterway component illustrating that the waterway need not be circular, and is depicted as flat on the bottom in the figure.

As illustrated in FIG. 4, the waterway arms (220B shown) need not be circular, but rather can have non-circular shapes and combinations thereof. As illustrated in the figure, arm 220B has an essentially horizontal floor 248 and an essentially circular ceiling connected by arcuate walls 252. In order to assist in minimizing any molten plastic flow into a terminal end lip 240B', a plurality of ribs 246 are molded into waterway arm 220B toward terminal lip 240B'. Depending on the exterior configuration of core pin 300, terminal end lip 240B' need not be flat, but rather can be arcuate in nature. In one aspect of the invention (illustrated in FIG. 4a), the top portion of the terminal lip is arcuate in a concave manner 240B", while the lower floor portion 248 is not.

Figure 5:
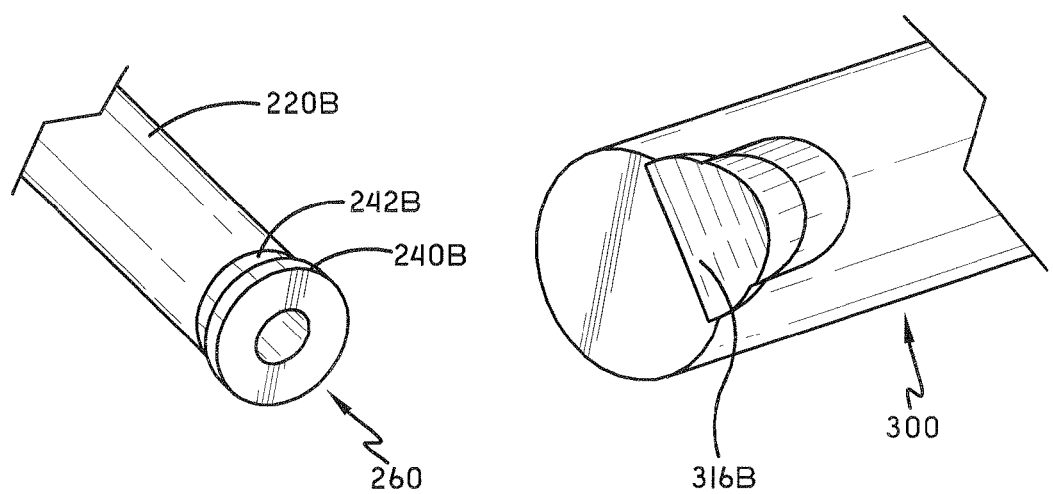
FIG. 5 is perspective view illustrating a sacrificial core insert into a waterway arm and one side of a core pin with associated cavity disposed therein.

In another embodiment of this invention, it is possible to achieve the lip/groove combination illustrated in FIG. 2 by the inclusion of a sacrificial insert illustrated in FIG. 5. By choosing an insert of outer diameter ("OD") which is similarly sized or preferably slightly smaller, than the ID of the waterway, it is possible to achieve a similar effect, without the need for a more expensive mold. Waterway arm 220B in this instance is a tube into which is inserted an insert 260, the insert having a circumferentially extending lip 240B and a groove 242B for insertion into insert cavity 316B of core pin 300, only one cavity being shown for illustration. It is recognized that depending on the elasticity of waterway arm 220B, it is possible that the OD of insert 260 can even be slightly larger than the ID of waterway arm 220B.

Figure 6:
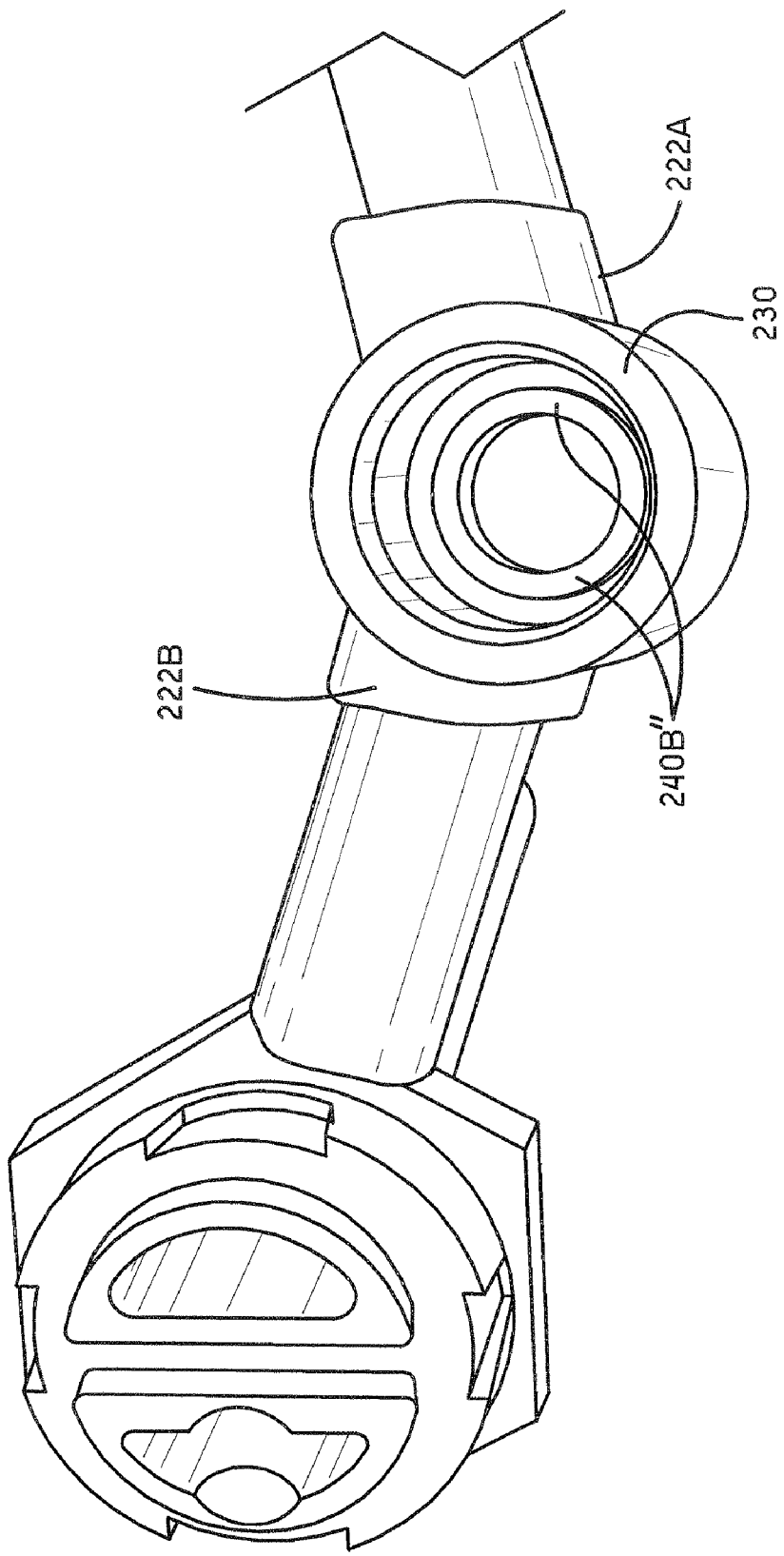
FIG. 6 is an enlarged top perspective view illustrating the overmolded central connector using the geometry of FIG. 4a for each waterway.

FIG. 6 illustrates an alternative embodiment to FIG. 2 using the terminal lip configuration illustrated in FIG. 4a, and provides for a more circular opening through the combination of the concave arcuate terminal lip 240B" in the ceiling of the waterway.

In the manufacture of waterway connection, there are a series of steps which are employed. In one embodiment, the initial step is to take a polymeric tube of defined composition and to overmold a defined geometry using two vertical core pins and one horizontal core pin all positioned at least partially within a split mold. When the overall connection is V-shaped, two essentially identical mirror image molds are necessary. Each mirror image side is then positioned as illustrated in FIG. 2 or FIG. 6 into a second split mold using a core pin similar to that shown in FIG. 3. The core pin has two interior grooves 316A, 316B into which lips 240 are positioned. The configuration of the lips can be as illustrated by 240B or 240B' or 240B" depending on the desired geometry of the opening within central connector 230. Interior of both interior grooves 316A, 316B is wall of geometry which matches the design of lips 240, which functions as a stop to prohibit molten polymer flow into waterways 220.

Figure 7:
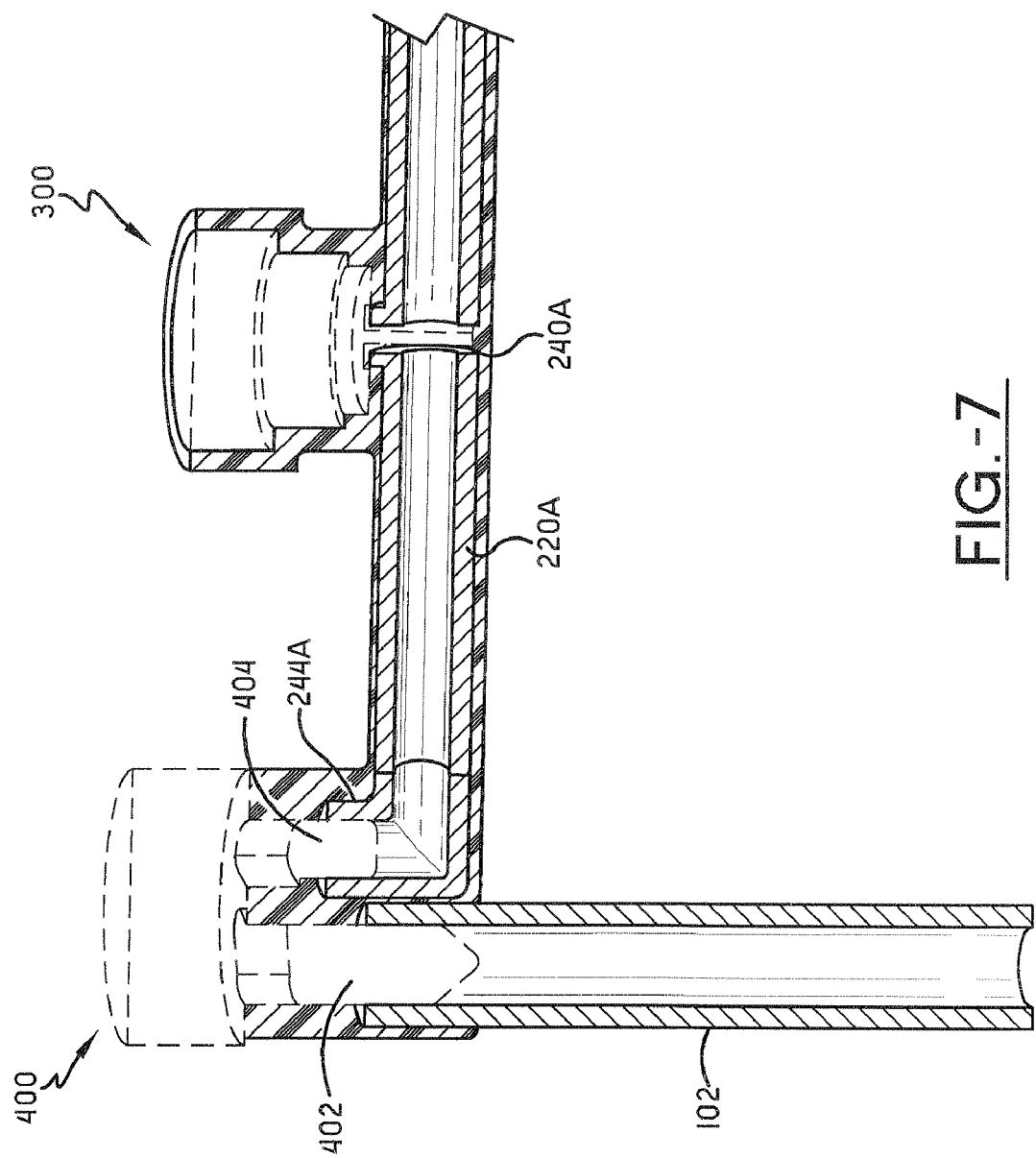
FIG. 7 is a side perspective view of one-half of a waterway connector in which the waterway arm is an insert having one right angle bend in which the overmolded component is illustrated in cross-section.
Figure 8:
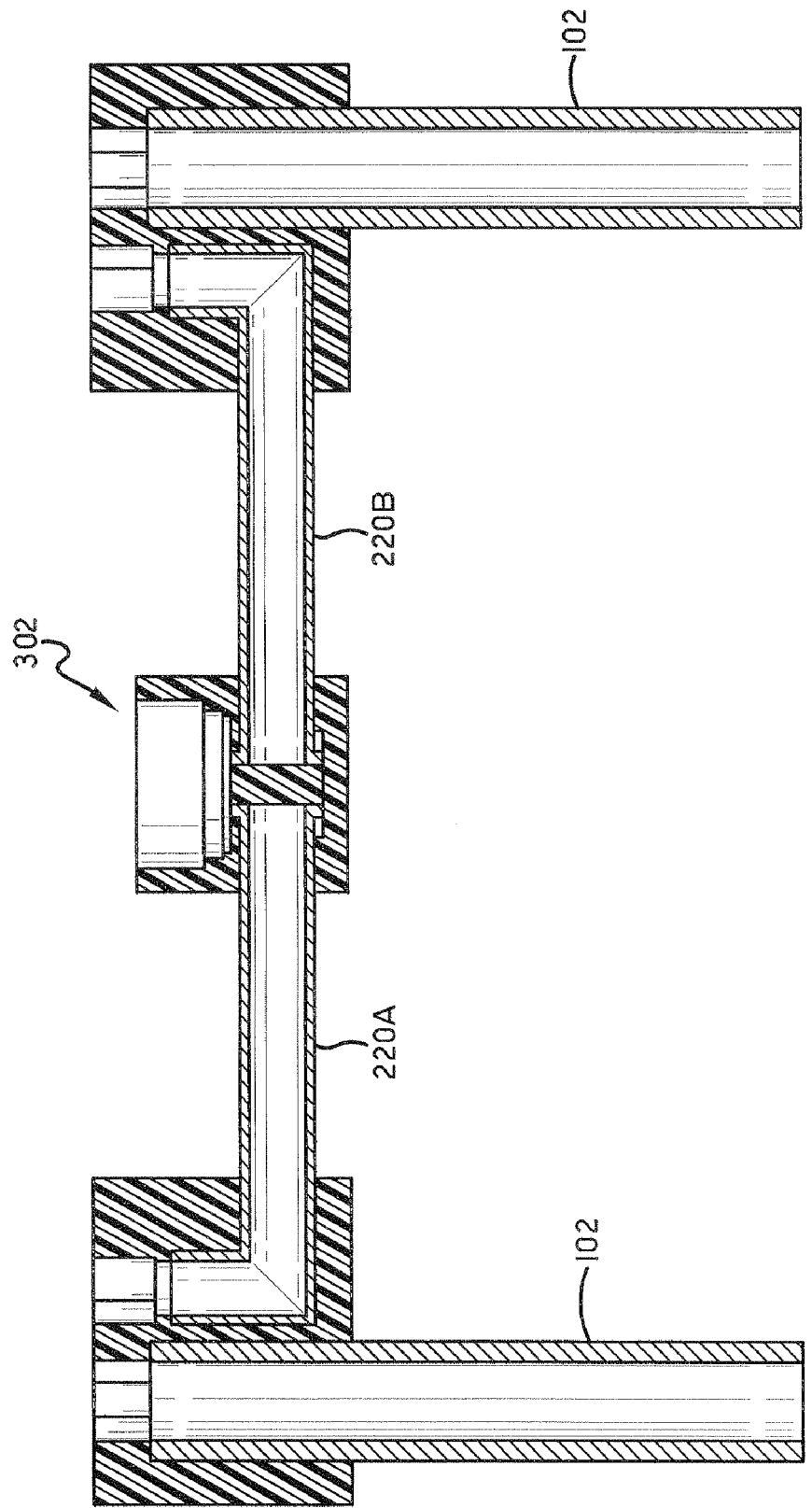
FIG. 8 is a side elevational view shown in partial cross-section of yet another alternative embodiment of the invention.

In an alternative embodiment illustrated in FIGS. 7 & 8, the manufacture is similar to that described above, with the modification being that waterway arm 220A has an upwardly extending segment 244A at the end opposite lip 240A. With this configuration, it is possible to employ a core pin 400 with two protruding pins 402, 404 during the overmolding operation.

Figure 9:
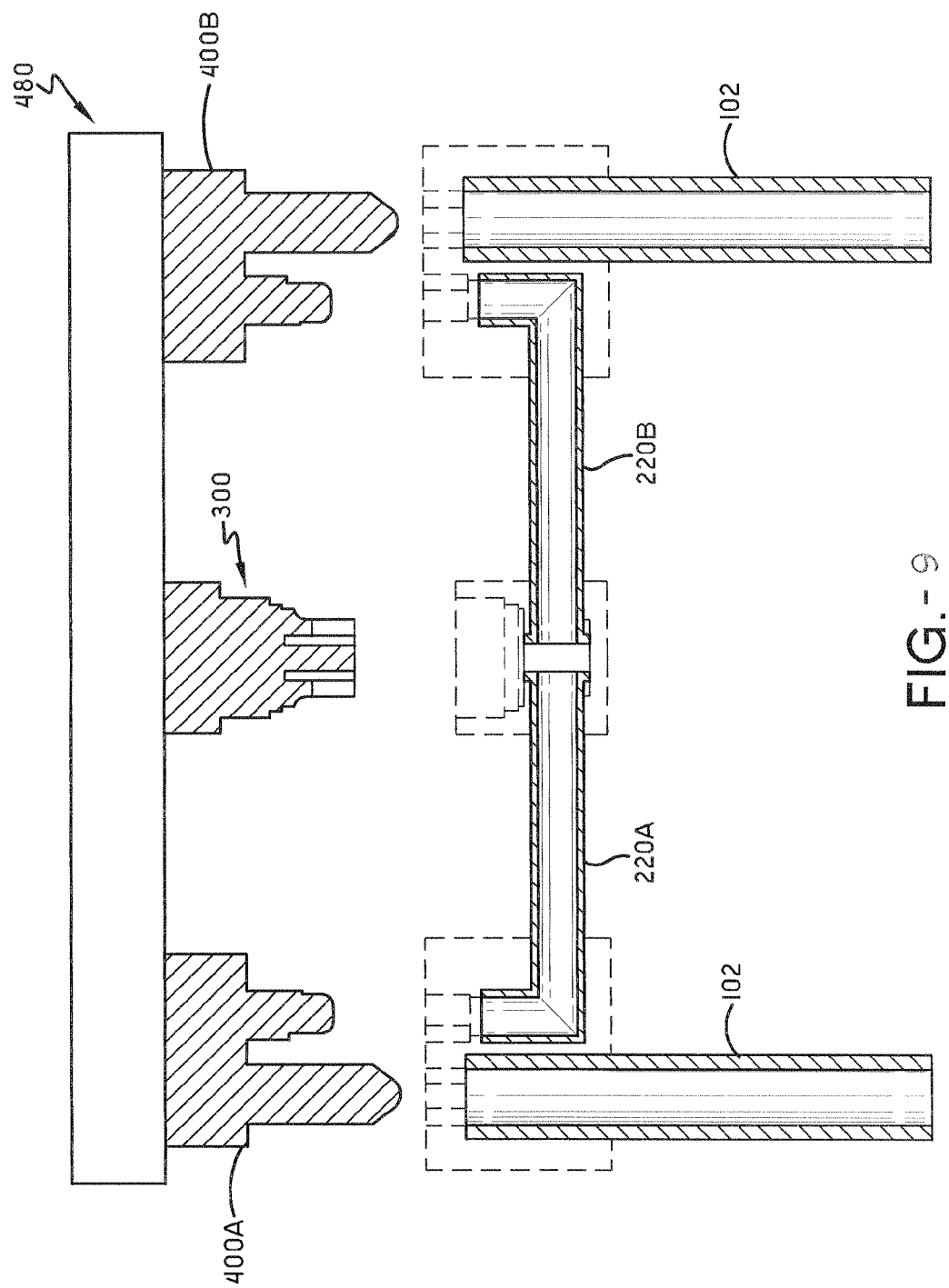
FIG. 9 is a side elevational view shown in partial cross-section of the core block interfacing with the component parts.

FIG. 9 illustrates the core block 480 which may be used to simplify the overmolding operation, the core block comprising the core 300 described previously and two minor image side cores 400A, 400B with two downwardly projecting pins.

Injection overmolding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. When the mold closes, the prefill valve shifts to close the opening to the reservoir. The area behind the main ram is then pressurized. After the injection cycle, the prefill valve opens to allow the clamp to gently open the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection overmolding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

While the precise composition of the plastic waterways and overmolded polymer are not required to be of any specified polymer, in general, there are several guidelines which are applicable in the practice of this invention. It is of course, recognized that the precise operating conditions utilized in the overmolding process are well-known in the art and is specific to each injection molded polymer. It is well within the skill of the art to determine the applicable conditions which will result in the appropriate overmolded polymer and plastic waterway. The degree of flexibility of the plastic conduit is not of particular relevance for this invention. The plastic waterway can be a thermoplastic or a thermoset. At least one aspect of the invention is that the overmolded polymer must be capable of forming a leak-proof bond, either chemical or physical, with the plastic of the waterway.

In the practice of this invention, illustrative and non-limiting examples of the polymers which may be used in various combinations to form the plastic conduit as well as polymers which may be used in the overmolding process would include: polyacetals, typically highly crystalline linear thermoplastic polymers of oxymethylene units; poly(meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

In a preferred embodiment, the polymers for both the waterway, plastic inlet tube and overmolded polymer will be high density polyethylene which is subsequently crosslinked, preferably by the application of an electron beam, although other modes of cros slinking are envisioned to be within the scope of this invention.

The trend today however, is to shift from thermoplastic materials, e.g., polypropylene, polybutylene, etc., to combined thermoplastic/thermoset materials, e.g., crosslinked polyethylene wherein at least a portion of the polymer is crosslinked, for example approximately 65% thermoset/35% thermoplastic. However, this shift in materials is not simple in that there are several processing changes which must be incorporated in order to fabricate acceptable parts. Since thermosets in general, cannot be extruded like thermoplastics, differing processing conditions must be employed in different sequences in order to achieve similar functionality for the thermoset/thermoplastic product. While thermoplastic material can chemically bond to itself, as the percentage of crosslinking increases, there is less thermoplastic remaining to form this chemical bond. Therefore, without being limited to any one theory of operation, it is believed that one of the keys is the recognition of the need to form overmolded components at the earliest time when they are the least crosslinked. When crosslinking using radiation, this is before any crosslinking occurs. With silane crosslinking, this is typically after extrusion, but before crosslinking is complete.

The combination of the above polymers must satisfy at least two simultaneous conditions. First, the plastic conduit must not soften and begin melt flow to the point where it looses structural integrity and second, the overmolded polymer must be capable of forming an essentially leak-proof interface with the plastic conduit, preferably through either a chemical and/or physical bond between the underlying plastic and the overmolded plastic. One of the keys is the recognition that the plastic conduit must be capable of maintaining structural integrity during the overmolding conditions during which the overmolded polymer is in melt flow.

While using polymer compositions which have differing softening points is one way to achieve the above objective, there are alternatives, which would include the use of two compositions which have the same softening point, but which are of different thicknesses, thereby through the manipulation of the time, temperature and pressure conditions experienced during the molding operation, the plastic conduit would not experience melt flow, even though it had a similar softening point or range. It is also possible that through the incorporation of various additives in the polymeric compositions, e.g., glass fibers, heat stabilizers, anti-oxidants, plasticizers, etc., that the softening temperatures of the polymers may be controlled.

In a preferred embodiment of the invention, the composition of the overmolded polymer will be such that it will be capable of at least some melt fusion with the composition of the plastic conduit, thereby maximizing the leak-proof characteristics of the interface between the plastic conduit and overmolded plastic. There are several means by which this may be achieved. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

In yet another embodiment, composites of rubber/thermoplastic blends are useful in adhering to thermoplastic materials used in the plastic conduit. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is believed, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having internally latent stresses which upon the application of heat permit the relaxation of the stresses with resulting contraction of various polymeric strands within the composition during cooling.

In one specific embodiment of this invention which meets the above criteria, the plastic conduit will be polypropylene and the overmolded polymer is SANTOPRENE® thermoplastic elastomer by Advanced Elastomer Systems having a Shore A durometer of approximately 73. Due to the fact that the SANTOPRENE® polymer is an ethylene-propylene copolymer, the melt fusion of at least a portion of the polypropylene with at least the propylene portion of the SANTOPRENE® will be effected.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process to make a waterway connector having at least two arms and a central connector comprising the steps of:
   at least partially inserting one end of a first tube into a first split mold;
   inserting at least two first mold pins at least partially into the first mold, a first pin of the at least two first mold pins inserted into the one end of the first tube and a second pin inserted transverse to the direction of insertion of the first pin;
   injection overmolding a first geometry onto the one end of the first tube and forming a first profile for fluid transfer with the second pin of the at least two first mold pins and associated mold surfaces, the first profile having a first terminal lip;
   at least partially inserting one end of a second tube into a second split mold;
   inserting at least two second mold pins at least partially into the second mold, a first pin of the at least two second mold pins inserted into the one end of the second tube and a second pin inserted transverse to the direction of insertion of the first pin;
   injection overmolding a second geometry onto the one end of the second tube and forming a second profile for fluid transfer with the second pin of the at least two second mold pins and associated mold surfaces, the second profile having a second terminal lip;
   at least partially inserting the first profile and the second profile into a third split mold, the first and second terminal lips engaging a core; and
   injection overmolding a third geometry about the first and second terminal lips forming a leak-proof central connector.

2. The process of claim 1 where the first profile is substantially a mirror image of the second profile.

3. The process of claim 1 where first and second terminal lips engage mating grooves in the core.

4. The process of claim 1 where the first profile, the central connection, and the second profile form a V-shape.

5. The process of claim 1 which further comprises a step of cros slinking the waterway connector.

6. The process of claim 1 where at least one of the first profile and the second profile has a circular cross-section.

7. The process of claim 1 where at least one of the first profile and the second profile has a substantially flat bottom and approximately circular ceiling.

8. The process of claim 1 where at least one of the first terminal lip and second terminal lip comprises a concave portion.

9. The process of claim 1 wherein the step of inserting at least two first mold pins includes inserting at least three pins, the third pin approximately parallel to the first pin.

10. The process of claim 1 wherein the step of inserting at least two second mold pins includes inserting at least three pins, the third pin approximately parallel to the first pin.

11. The process of claim 1 where the first terminal lip comprises a first insert, and prior to the step of injection overmolding the first geometry, the process to make a waterway connector further comprises the step of at least partially inserting the first insert onto the second pin of the first mold.

12. The process of claim 1 where the second terminal lip comprises a second insert, and prior to the step of injection overmolding the second geometry, the process to make a waterway connector further comprises the step of at least partially inserting the second insert onto the second pin of the second mold.

* * * * *